United States Patent
Cook et al.

(10) Patent No.: US 7,068,891 B1
(45) Date of Patent: Jun. 27, 2006

(54) SYSTEM AND METHOD FOR POSITIONING OPTICAL FIBERS

(75) Inventors: Harold Cook, Pittsburgh, PA (US); John Bridgen, Pittsburgh, PA (US); David Deutsch, Monroeville, PA (US); Michael Formica, Butler, PA (US); Matthew Maurer, Moon Township, PA (US); Brian Zeik, Monroeville, PA (US)

(73) Assignee: Palomar Technologies, Inc., Carlsbad, CA (US)

( * ) Notice: Subject to any disclaimer, the term of this patent is extended or adjusted under 35 U.S.C. 154(b) by 675 days.

(21) Appl. No.: 10/157,358

(22) Filed: May 29, 2002

Related U.S. Application Data

(60) Provisional application No. 60/363,855, filed on Mar. 12, 2002, provisional application No. 60/364,661, filed on Mar. 16, 2002.

(51) Int. Cl.
*G02B 6/26* (2006.01)

(52) U.S. Cl. .......................................... 385/52; 385/88

(58) Field of Classification Search .................. 385/52, 385/88, 90, 31, 39, 147
See application file for complete search history.

(56) References Cited

U.S. PATENT DOCUMENTS

| 4,331,384 A | 5/1982 | Eisler |
| 4,506,154 A | 3/1985 | Scire |
| 4,694,477 A | 9/1987 | Siddall |
| 4,805,543 A | 2/1989 | Schwab et al. |
| 4,874,979 A | 10/1989 | Rapp |
| 5,080,458 A | 1/1992 | Hockaday |
| 5,121,457 A | 6/1992 | Foley et al. |
| 5,163,113 A | 11/1992 | Melman |
| 5,243,671 A | 9/1993 | Koteles et al. |
| 5,296,072 A | 3/1994 | Dannoux et al. |
| 5,361,317 A | 11/1994 | Hartman et al. |
| 5,447,585 A | 9/1995 | Dannoux et al. |
| 5,505,104 A | 4/1996 | Takei |
| 5,506,928 A | 4/1996 | Evans et al. |
| 5,521,993 A | 5/1996 | Lerminiaux et al. |
| 5,524,502 A | 6/1996 | Osanai |
| 5,533,844 A | 7/1996 | Ekleberry |
| 5,574,811 A | 11/1996 | Bricheno et al. |
| 5,579,424 A | 11/1996 | Schneider |
| 5,685,232 A | 11/1997 | Inoue |
| 5,745,624 A | 4/1998 | Chan et al. |
| 5,794,541 A | 8/1998 | Hirose |
| 5,847,387 A | 12/1998 | Shedd et al. |
| 5,857,047 A | 1/1999 | Strand et al. |
| 5,916,458 A | 6/1999 | Komoriya et al. |
| 5,926,594 A | 7/1999 | Song et al. |
| 5,943,915 A | 8/1999 | Kato |
| 6,006,639 A | 12/1999 | Cherbettchian |
| 6,085,670 A | 7/2000 | Genov |
| 6,118,637 A | 9/2000 | Wright et al. |
| 6,118,917 A | 9/2000 | Lee et al. |

(Continued)

*Primary Examiner*—Daniel StCyr
(74) *Attorney, Agent, or Firm*—Rodney F. Brown

(57) ABSTRACT

A stage positioning system and method for aligning optical components according to a figure of merit is disclosed. The system includes a stage assembly having six axes of freedom wherein the pivot point of the stage assembly motion is user definable and preferably outside the envelope formed by the stage assembly. The stage assembly includes three sub-assemblies. A base sub-assembly provides x and z axes motion, a yaw stage provides yaw about the y axis, and a three-axis stage provides y motion as well as pitch and roll about the x and z axes, respectively.

24 Claims, 14 Drawing Sheets

U.S. PATENT DOCUMENTS

| | | |
|---|---|---|
| 6,122,423 A | 9/2000 | You et al. |
| 6,164,837 A | 12/2000 | Haake et al. |
| 6,174,092 B1 | 1/2001 | Siala |
| 6,184,987 B1 | 2/2001 | Jang et al. |
| 6,193,226 B1 * | 2/2001 | Davies ........................ 269/71 |
| 6,237,370 B1 | 5/2001 | Bloom |
| 6,244,192 B1 | 6/2001 | Suzuki et al. |
| 6,253,011 B1 | 6/2001 | Haake |
| 6,325,551 B1 | 12/2001 | Williamson, III et al. |
| 6,498,892 B1 * | 12/2002 | Harman ....................... 385/137 |
| 6,606,444 B1 * | 8/2003 | Harman et al. .............. 385/137 |
| 6,618,514 B1 * | 9/2003 | Cole ............................ 385/14 |

\* cited by examiner $$d = \sqrt{(\Delta x)^2 + (\Delta y)^2}$$

$$r = \frac{d}{2 - \sin\left(\frac{\theta}{2}\right)}$$

SYSTEM AND METHOD FOR POSITIONING OPTICAL FIBERS

CROSS-REFERENCE TO RELATED APPLICATION

This application claims priority to U.S. Provisional Patent Application Nos. 60/363,855, filed Mar. 12, 2002 and 60/364,661, filed Mar. 16, 2002, which are incorporated herein by reference.

BACKGROUND OF THE INVENTION

1. Field of the Invention

The subject disclosure relates to systems and methods for positioning objects, and more particularly, to an improved system and method for actively aligning an optical fiber to a laser diode, a fiber array to an optical waveguide, and the like.

2. Background of the Related Art

High-accuracy positioning stages have many industrial and scientific applications. Conventional translation devices with one degree of freedom comprise a mobile platform sliding on a base frame. The range of movement determined by typical sliding, or kinematic guides is controlled by an actuator, whose body is fixed to the base frame and whose mobile part is connected to the platform by an appropriate transmission means. When the movement of the actuator is approximately rectilinear and parallel to the translational axis of the guide, the transmission means is often no more than the platform being supported against the actuator through an intermediate ball. The retention of such a platform against the intermediate ball is generally ensured by a spring stretched between the frame and the platform. Two well known actuators are manual micrometer screws and piezoelectric disk stacks.

Many applications require several axes of motion. Multi-axis motion can be obtained by stacking several stages. For example, such stacking may take the form of bolting the top plate of one bearing stage to the base of another linear stage so that the respective positioning axes are at right angles to each other to produce a two-axis stage, or so-called "xy"-stage. Moreover, by then bolting an L-bracket onto the top-plate of the y-stage and a further bearing stage onto the upright of the L-bracket, a three-axis stage, or so-called "xyz"-stage, is produced.

Sometimes multi-axis stages are supplied as integrated units. For example, in an xy-stage, the top plate of the x-stage can also serve as the base plate of the y-stage, to reduce size and weight. Flexure stages can also be nested in various ways to make them more compact. Additional features may accomplish rotational movement about an axis. In such circumstances, a maximum of six possible degrees of freedom is available: x, y and z linear movement and rotation about such axes (e.g., "pitch", "yaw" and "roll", respectively).

The integration of parts as described above does not affect the basic principle of operation which is to use a number of similar mechanisms connected serially. There are, however, several drawbacks to overcome in the use of a series of multi-axis stage assemblies, including the following:

1. The complexity and cost tends to increase with the number of axes;
2. The mass of moving parts increases with the number of axes, making the stage slower to respond;
3. The number of moving parts increases with the number of axes, making the stage assembly more susceptible to vibrations;
4. The force of repositioning a stage is transmitted through the preceding stages, causing disturbance, i.e. error, to the position of the stage assembly; and
5. The stiffness of the stage assembly decreases as the number of axes increases.

Additionally, undesirable deviations are amplified by the stacking of stages. This phenomenon is commonly known as "Abbe" error. The Abbe principle is the magnification of undesirable angular motion as the displacement of the workpiece from the undesirable angular motion increases.

One example which attempts to overcome some of these deficiencies is U.S. Pat. No. 4,694,477 to Siddall which is incorporated herein by reference. Siddall shows a stage apparatus with six degrees of freedom. The invention of Siddall has a single stage 1 supported vertically by three actuator assemblies 11, 13 and 15. The actuator assemblies 11, 13 and 15 consist of flexures 17, 19 and 21, respectively, coupling piezoelectric transducers to the stage 1 at three equiangular points. The three vertical actuator assemblies accomplish vertical linear motion and rotation about two perpendicular horizontal axes. Three similar horizontal actuator assemblies 37, 39 and 41 are attached to the stage 1 for accomplishing linear movement of stage 1 along two perpendicular horizontal axes. When the two parallel horizontal actuator assemblies 37, 39 are moved in opposite directions, rotation of stage 1 about the vertical axis is accomplished. Each of the pivot points for the pitch, roll and yaw motions is located within the stage assembly and the range of travel is limited.

Currently, the telecommunications network serving the United States and the rest of the world is evolving from analog to digital transmission with ever increasing bandwidth requirements for transmitting voice and data. Fiber optic cable is capable of carrying much more information than traditional copper cable. As a result, one method to increase bandwidth of telecommunications networks is realized by replacing copper cable with fiber optic cable. A large market for optoelectronic devices to supply the new technologies of high-speed communications has developed to meet this requirement. In tandem, a strong market has also developed for the sophisticated positioning apparatus required to manufacture such optoelectronic devices.

A key consideration in the design of fiberoptic networks is the effect of attenuation. Attenuation determines the maximum length of fiber that may be included between two points before it is necessary to include a signal repeater in the communication path that retransmits the signal. Attenuation occurs due to the light that carries the signal either leaking out of the fiber or being absorbed by the material from which the fiber is made. When the strength of the signal falls below a certain level as a result of this attenuation, the signal to noise ratio of the system may become too low for effective data transfer to be maintained and a repeater is required.

One known method to reduce the effects of attenuation on a transmitted signal is to increase the power of the light transmitted into the optical fiber. For a given amount of attenuation per length of fiber, increasing the power input to the fiber increases the distance that the fiber may be run before the signal level becomes unacceptably small. Of course, one way of increasing the power input to the fiber is to increase the power of the laser used to generate the light that is coupled to the fiber. Another way of increasing the strength of the signal carried by the fiber is to more efficiently couple, i.e. align, the modulated light from the laser into the fiber.

To meet such demand and efficiency requirements, the optoelectronic devices must be fabricated with a high degree of accuracy and in large quantity. In view of these needs, various techniques have been developed for applying positioning stage assemblies to align optical components. "Pigtailing" is the term commonly used to describe the process of aligning and attaching an optical fiber in front of an active optoelectronic device, such as a laser diode.

Additionally, pigtailing requires that the device and fiber be permanently coupled mechanically. Typically, this involves sub-micrometer accuracy, performed manually by skilled technicians working with microscopes and high-precision manipulators. In general, even though the step of coupling the light from the laser into a flat-end fiber is of critical importance, the process is not only time consuming but very inefficient, with many processes resulting in only about 10 to 15 percent of the laser light output being coupled into the fiber. Moreover, these techniques not only require skilled labor; but often, these techniques are more in the nature of an art which cannot easily, if at all, be transferred from one worker to another worker.

To elaborate with an example, the light coupled into or out of the optical fiber is highly sensitive to the alignment of the optical fiber with the laser or the detector and any optical system that is used between the optical fiber and such devices. A slight misalignment of the optical fiber may cause a large decrease in the amount of light coupled into the fiber from the laser or out of the fiber to the detector. In general, this problem is more serious at the laser end because the size of the emitting region of a typical laser diode used in such systems is approximately 2 microns by 4 microns. Similarly, the small aperture of a single mode optical fiber presents a significant technical challenge when aligning. Moreover, the use of focusing optics to focus light from the laser into the optical fiber also increases the sensitivity of the amount of coupling to the alignment of the cable with the source and any discrete optical devices used. In view of the above, once each optoelectronic device is assembled, testing is required to verify performance. Upon verification, the device is typically assembled onto a printed circuit board for connection to other electronic and optical signal processing components.

In view of the above, several techniques for coupling optical fibers to optical devices have been developed. Some examples are illustrated in U.S. Pat. Nos. 6,325,551; 6,253,011; 6,193,226; 6,174,092; 6,164,837; and 5,926,594, each of which is hereby incorporated by reference as part of the present disclosure.

Alignment of an optical fiber with an optoelectronic device may be accomplished by using a stage assembly to change the position of the optical fiber while measuring the amount of light coupled from the optical fiber to the optoelectronic device, e.g., "active" alignment. If, for example, the optoelectronic device is a laser diode, the light coming out of the other end of the optical fiber may be measured and the optical fiber may be positioned so that the amount of light output is maximized. Once the optical fiber is properly positioned, it is desirable to fix the alignment in a manner such that the alignment remains unchanged. Numerous methods of fixing optical fibers to supports also have been developed. These methods include epoxying or gluing the fiber to a mount, laser welding the fiber to a mount, and soldering the fiber to a mount. While a certain amount of success has been enjoyed using these prior art systems and methods for pigtailing, there are clear drawbacks and disadvantages with them.

Accordingly, it is an object of the present invention to provide a high-speed, high-precision instrument for the active alignment of fibers for the manufacture of optoelectronic devices. The improved instrument and method would preferably permit modification for varied specifications to minimize capital costs and aid in assuring adequate yield of product at a high throughput.

It is another object of the present invention to provide a system and method for actively aligning fibers in the manufacture of optoelectronic devices that overcomes one or more of the above-described drawbacks and disadvantages of the prior art.

SUMMARY OF THE INVENTION

The present invention is directed to an instrument and method for positioning an article with six degrees of freedom about a selectable pivot point. The instrument includes a base stage for linear motion in two perpendicular axes wherein the perpendicular axes form a plane. A yaw stage is coupled to the base stage for rotational motion about a third axis normal to the plane. The yaw stage has a pivot point locatable outside an envelope defined by the yaw stage. A three-axis stage coupled to the yaw stage provides for rotational motion about each of the two perpendicular axes and linear motion along the third axis. The third stage may also include a mount for fixing the article thereto. A control system is in communication with each of the stages for controlling the positions thereof. In one embodiment, the selection of the pivot point is via software. Preferably, the pivot point of the yaw stage is calibrated to correspond to a location of the article such that motion of the article to a desired location is accurate. In alternative embodiments, the selection of the pivot point is by adjustment of hardware or a combination of hardware and software.

The yaw stage includes a housing having a portion defining a ground link. A first slider link has a substantially straight first slide path relative to the ground link and the first slide path and the ground link form an angle $\phi$. A second slider link has a substantially straight second slide path relative to the ground link, and the second slide path and the ground link form an angle $\omega$. A bearing defines a connecting link and a length such that the relationship between the length, the angle $\phi$ and the angle $\omega$ defines a rotation point that is locatable external to the yaw stage. The location of the pivot point of the yaw stage is variable by adjusting the length, the angle $\phi$ and/or the angle $\omega$.

The present invention is also directed to an instrument and method for coupling an optical fiber with an optical device including a control system having a processor and memory for storing instructions for the processor. A stage assembly is in communication with the control system and has six degrees of freedom for positioning the optical fiber with respect to the optical device. The stage assembly defines an envelope and a pivot point locatable outside the envelope, wherein the memory also stores data related to the pivot point for increasing the accuracy of moves of the stage assembly. The data for the pivot point is generally applicable parameters derived from analysis of the physical structure of the stage assembly. In another embodiment, the data for the pivot point is unique calibration data based upon a combination of theory and empirical data. A mounting fixture receives the optical device. Further, the mounting fixture may also send and receive electrical signals and provide power to the optical device. An optical prealigner has a camera coupled to the control assembly for acquiring first light across a junction between the optical fiber and the optical device. Upon acquiring first light, the control system drives the stage assembly to maximize fidelity across the junction by processing data associated with positions of the stage assembly. A second stage assembly also in communication with the control system having six degrees of freedom, positions a second optical fiber with respect to the optical device. The second stage assembly defines an envelope and a second pivot point outside the envelope, wherein the memory also stores calibration data related to the second pivot point for increasing the accuracy of moves of the second stage assembly.

One advantage of the system and method of the present invention is that the stage assembly has a very compact envelope and the pivot point for rotational movement can be selected to correspond to the location of the portion of the device being aligned. As a result, the moves of the stage assembly are relatively accurate and contain a minimum of Abbe error.

It should be appreciated that the present disclosure can be implemented in numerous ways, including without limitation as a process or method, a system, or as an instrument, apparatus or device. Several inventive embodiments of the present invention are described below. These and other unique features and advantages of the system and method disclosed herein will become more readily apparent from the following detailed description, the accompanying drawings and the appended claims.

BRIEF DESCRIPTION OF THE DRAWINGS

So that those having ordinary skill in the art to which the disclosed invention pertains will more readily understand how to make and use the same, reference may be had to the drawings wherein.

DETAILED DESCRIPTION OF THE PREFERRED EMBODIMENTS

Figure 1:
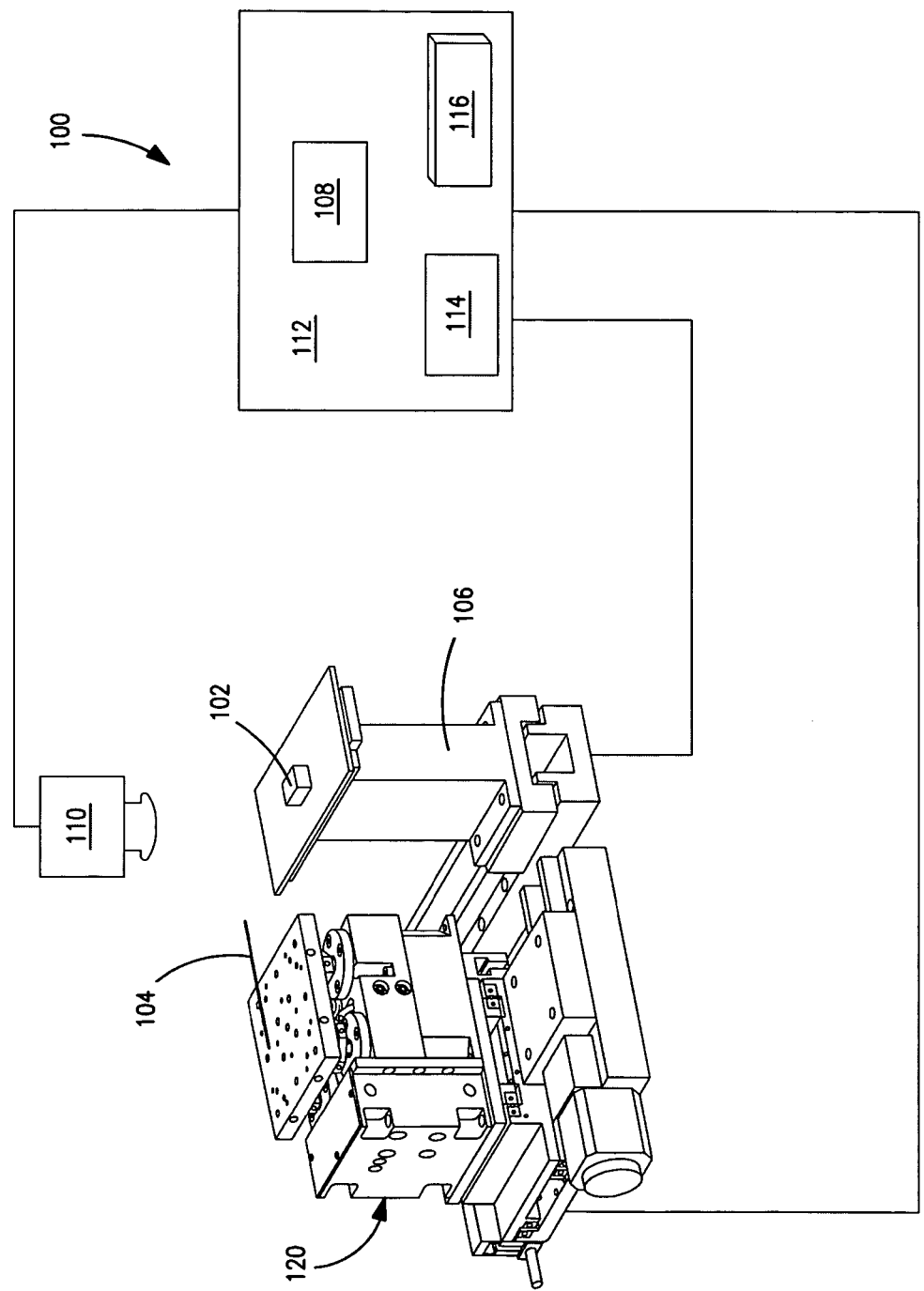
FIG. 1 is a schematic view of an optical fiber pigtailing instrument embodying the present invention for performing active alignment between an optical fiber and an optoelectronic device.

The present invention overcomes many of the prior art problems associated with multi-axis stages used for aligning optical fibers to optical devices. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, the optical fiber pigtailing instrument 100 provides automated optical fiber alignment to an optoelectronic device 102 using a multi-axis high precision stage assembly 120 located within a housing (not shown) of a type known to those of ordinary skill in the pertinent art for ensuring cleanliness and safety. The stage assembly 120 positions an optical fiber 104 based upon the fidelity of the junction between the optical fiber 104 and the device 102. The fidelity across the junction may be expressed in terms of numerous figures of merit, such as power output, signal-to-noise ratio and the like. In the preferred embodiment, the stage assembly 120 is capable of six degrees of freedom. It is envisioned that the stage assembly 120 can move in two, three, four, five or six directions, as would be appreciated by those of ordinary skill in the art based upon review of the subject disclosure.

The following description is in relation to an alignment wherein the optoelectronic device 102 under assembly is a laser diode oriented to a single mode optical fiber 104 based upon power output. However, as may be recognized by those of ordinary skill in the art based upon the teachings herein, the instrument of the present invention is equally useful for high-precision placement and alignment of a variety of devices in a plurality of areas such as a micro electro mechanical system (commonly knows as a MEMS) and the like. Generally, the laser diode 102 is fixed upon a mounting fixture 106 in close proximity to the optical fiber 104. The mounting fixture 106 typically provides a mechanical reference point against which the laser diode 102 to be aligned is placed. The laser diode 102 is coupled to a power module 108 which energizes the diode 102. However, due to variation in manufacturing tolerances and the small diameter of the laser diode emission upon a small diameter fiber, it is atypical for a mechanical alignment to yield a signal of any kind.

To achieve "first light", i.e. an initial signal across the junction, a prealignment system 110 locates the end of the fiber 104 for adjustment of the orientation thereof. Preferably, the prealignment system 110 is an optical system which images the end of the fiber. The optical prealignment system 110 may include one or more cameras as would be appreciated by those of ordinary skill in the pertinent art. It is also envisioned that charge-coupled device camera and the like may be employed in the prealignment system 110.

In an optical prealigner system embodiment, once the fiber image is recognized at a known field size, a control system 112 of a type known to those of ordinary skill in the pertinent art uses the output of the prealignment system 110 to align the fiber 104 with the diode 102. In another embodiment, after receiving an image, the stage assembly 120 repositions the fiber 104 a known distance, e.g., a calibration jog, to determine the pixel size. Upon determining the pixel size, the fiber 104 can be accurately positioned and, therefore, aligned to the diode 102 based upon digital recognition of the fiber end.

The optical signal generated once first light is achieved passes from the fiber 104 to a power meter 111 where the signal is read by the control system 112. When the control system 112 successfully receives the required signal, the control system 112 indicates to the user that first light has been achieved and the optical prealignment terminates. Additional exemplary techniques for optical prealignment are disclosed in U.S. Pat. No. 5,506,928 to Evans et al., U.S. Pat. No. 5,857,047 to Strand et al. and U.S. Pat. No. 6,174,092 to Siala, each of which is incorporated herein by reference.

After first light is achieved, algorithms based upon the actual position of the fiber 104 in relation to the pivot points of the stage assembly 120 determine the most efficient stage assembly motion to achieve maximum power output. Within the control system 112, a processor 114 with memory 116 stores the algorithms and the necessary instruction code to control the stage assembly 120 during optimization. In one embodiment, a raster scan algorithm positions the fiber 104 at a multitude of locations which form a square about the first light position wherein the position with the maximum reading corresponds to the optimum alignment. In another embodiment, a hillclimb algorithm searches for ascending signal trends to determine the maximum alignment. As would be appreciated by those of ordinary skill in the pertinent art, a variety of alignment algorithms can be used interchangeably. Preferably, the method of alignment is user selectable to allow for maximum throughput and performance.

Once the fidelity of the fiber to diode junction is maximized, the relationship of the junction is fixed, for example, by a soldering sub-assembly (not shown). Other conventional techniques include dispensing and curing epoxy or laser welding, such as disclosed in U.S. Pat. No. 5,121,457 to Foley et al., U.S. Pat. No. 5,163,113 to Melman, U.S. Pat. No. 5,926,594 to Song et al. and U.S. Pat. No. 6,164,837 to Haake et al., each of which is incorporated herein by reference.

Figure 2:
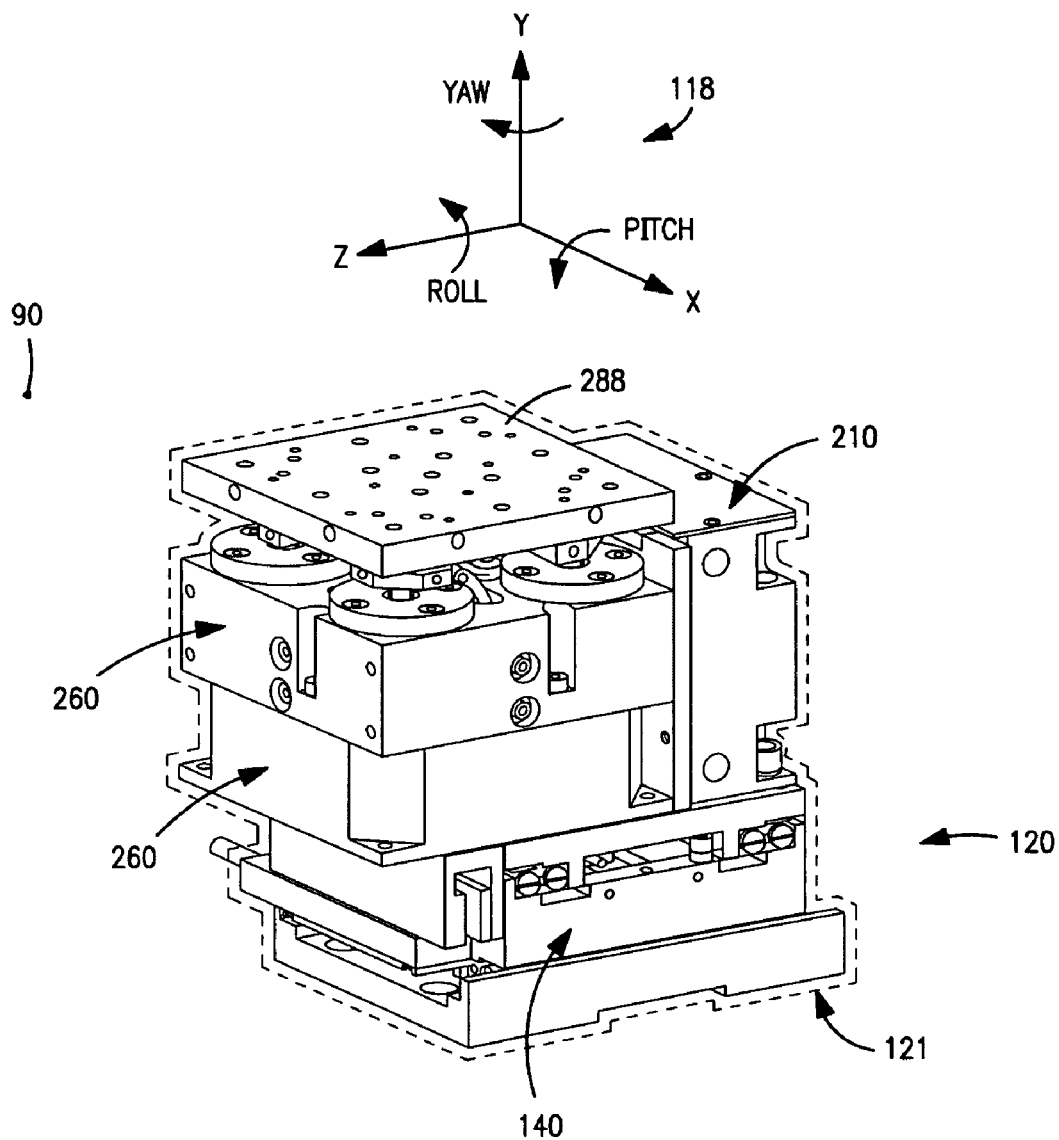
FIG. 2 is a perspective view of the six-axis stage assembly of the optical fiber pigtailing instrument of FIG. 1.
Figure 3A:
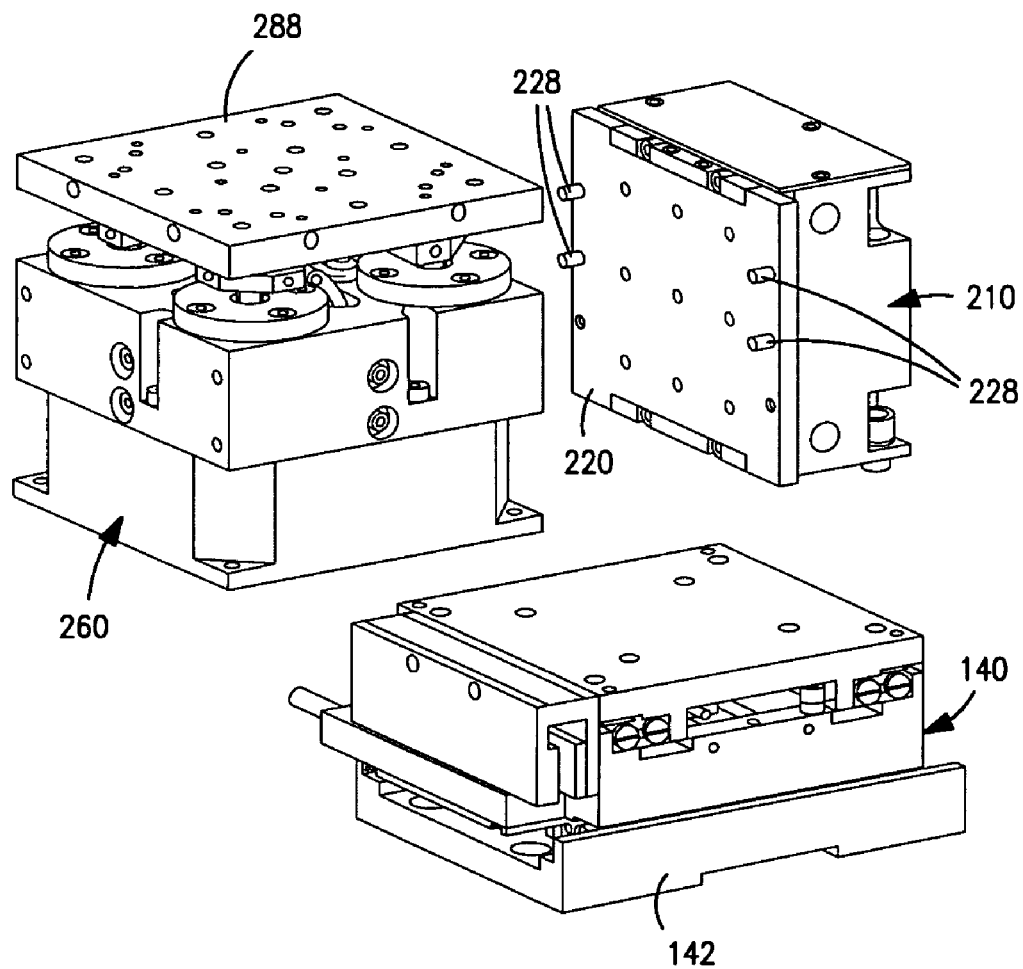
FIG. 3A is a partially exploded view of the stage assembly of the optical fiber pigtailing instrument of FIG. 2.

Now referring to FIGS. 2 and 3A, conventionally, the axis formed by an elongated optical fiber 104 is denoted the z axis. Such convention is observed herein and, for clarity, a legend 118 is included. The legend 118 indicates six axes, i.e. the x, y and z axes, as well as the rotational motion about each axis (pitch, yaw and roll, respectively). In the preferred embodiment, the actual pivot point 90 (see FIG. 1) is defined by the yaw stage 210. One of the advantages of the present invention is that the actual pivot point may be located outside the footprint or envelope of the stage assembly 120, and need not be located on the fiber 104. Consequently, variations in the configuration of the fiber 104 and the associated mounting fixture 117 can be easily accommodated.

Figure 3B:
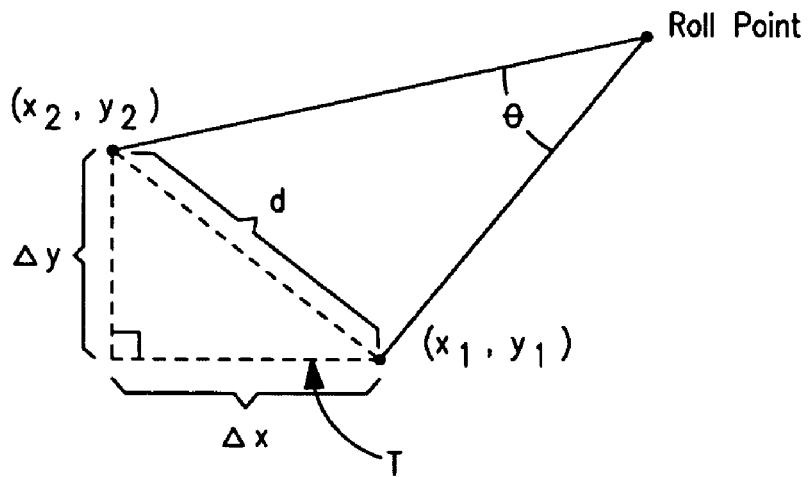
FIG. 3B is a schematic diagram of a roll motion calibration of the three-axis stage of the stage assembly of FIG. 3A.

Referring to FIG. 3B, to eliminate errors and therefore delays resulting from any discrepancy between the actual pivot point and location of the fiber 104, preferably a calibration routine determines the difference and stores the coordinates of the actual pivot point for use in subsequent move calculations. It is envisioned that due to manufacturing tolerances and the like, a series of calibrations may be required to ascertain a table of deviations from the theoretical positioning.

For example, to baseline the actual roll motion of the pivot point for accurate fiber alignment, a first stage position (x1, y1) of an optical fiber is recorded, then a known roll motion of angle theta ($\theta$) about the z-axis (such as 1 degree) occurs. Locating the fiber 104 again yields a second position (x2, y2). A right triangle T is formed based upon the delta between the two positions (x1, y2) and (x1, y2) and the known roll angle theta ($\theta$). The legs of the triangle T represent ($\Delta x$, $\Delta y$), respectively. Based upon the triangle T, the actual pivot point can be determined according to the following formulas $$d^2 = \Delta x^2 + \Delta y^2$$

$$r = d/[2-\sin(\theta/2)]$$

in which "d" is the hypotenuse of the triangle T, and "r" equals the distance between the actual pivot point and the locations of the optical fiber before and after the roll. Upon applying the data to these formulas in conjunction with the equation of a circle, calibration factors are determined to allow accurate prediction of the actual movement of the fiber despite the fiber being remotely located with respect to the actual roll point. It will be appreciated by those of ordinary skilled in the pertinent art that such calculations will generate constants which allow creation of a virtual pivot point which corresponds to the optical fiber. Consequently, positioning of the optical fiber accounts for the variation between the actual pivot point and the virtual pivot point.

Referring again to FIGS. 2 and 3A, the stage assembly 120 includes three modular sub-assemblies. The combination of the sub-assemblies determines which axes can be adjusted to perform an alignment. A base stage 140 accomplishes motion of the optical fiber 104 in the x and z axes. The length and width of the base stage 140 in the x and z axes determines the footprint of the stage assembly 120. A yaw stage 210 is coupled to the base stage 140 for adding rotational motion about the y axis. The optical fiber 104 may mount to an adapting plate (not shown) mounted on the yaw stage 210. The adapting plate may be any of numerous configurations for securing an optical device 104 to the operative portion of the yaw stage 210 as would be readily appreciated by one skilled in the art upon review of the subject disclosure. A configuration consisting of the base stage 140 and yaw stage 210 yields a three-axis (x, z and yaw) stage assembly.

In the preferred embodiment, a three-axis stage 260 mounts to the operative portion of the yaw stage 210 to provide the maximum six degrees of freedom. The three-axis stage 260 moves linearly in the y-axis as well as pitch and roll motion. Preferably, a top portion 288 of the three-axis stage 260 is adapted to receive a mount (not shown) for retaining the fiber 104 during alignment as well. The position of the subassemblies of the stage assembly 120 which minimizes the space taken by the stage assembly is commonly used to determine the envelope 121 of the stage assembly 120. The approximate envelope 121 of the stage assembly 120 is depicted in FIG. 2 by dashed lines. For example, a stage assembly 120 defining an envelope 121 of approximately 100×145×163 mm would yield 6 mm y travel and 5 degrees of pitch, roll and yaw. The x-axis and z-axis travel would be even greater. In another embodiment, the three-axis stage 260 mounts directly to the base stage 140 to provide a five axis stage assembly.

Figures 4A, 4B, 4C:
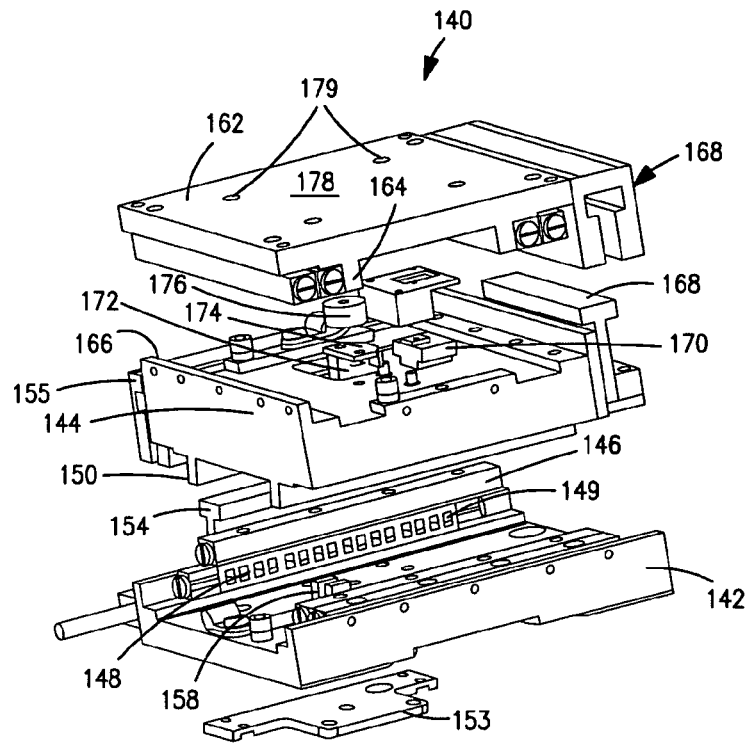
FIG. 4A is an exploded view of the base stage of the stage assembly of FIG. 3A.
FIG. 4B is an upside down perspective view of the x-carriage of the base stage of FIG. 4A.
FIG. 4C is an upside down perspective view of the z-carriage of the base stage of FIG. 4A.

Now referring to FIGS. 4A–C, the base stage 140 is mounted on a vibration isolation table or other suitable structure (not shown) located within the housing. A base portion 142 of the base stage 140 supports a z-carriage 144 in a linear sliding arrangement and is secured to the isolation table. The base portion 142 includes a roller bearing rail 146 to guide the linear sliding motion of the z-carriage 144 along the z-axis. A cross roller bearing cage 148 reduces friction between the base portion 142 and z-carriage 144 during movement. A bearing surface 150 depends from the z-carriage 144 for engaging the roller bearings 149 of the roller bearing cage 148. A linear motor assembly drives the z-carriage 144 and is attached thereto by a motor mounting plate 153. The linear motor assembly includes a motor coil 154 mounted on the base portion 142 and a corresponding magnet track 155 mounted on the z-carriage 144. An encoder assembly 156 tracks the location and direction of the z-carriage 144. The encoder assembly 156 includes a glass plate 157 and read head (not shown for simplicity). Preferably, the glass plate 157 has a grating which generates a pair of sine waves when passed by the read head as is known to those skilled in the pertinent art. In the preferred embodiment, the glass plate 157 is mounted on the underside of the z-carriage 144 and the read head is mounted on the base portion 142.

A sensor 158 mounted on the base portion 142 notifies the control system 112 (see FIG. 1) when a limit flag (not shown for simplicity) depending from the z-carriage 144 intersects therewith. The sensor 158 can not only determine a limit for motion of travel, but also can establish a baseline for referencing stage position along the z-axis. The control system 112 drives the linear motor assembly 154, 155 and receives the output of the encoder assembly 156 for determining location along the z-axis.

The z-carriage 144 supports the x-carriage 162 in a similar fashion to the manner in which the base portion 142 supports the z-carriage 144. Rails 164 extending along the x-axis depend from the x-carriage 162 for engaging roller bearing cages 166 upstanding from the z-carriage 144. As a result, the motion of the x-carriage 162 along the x-axis is guided in a linear direction. A linear motor assembly 168 provides the drive for the x-carriage motion and an encoder assembly 170 provides a position signal. Again, the control system 112 (see FIG. 1) utilizes a sensor 172 and flag 174 in combination to determine when a limit for motion of travel is reached and to establish a baseline for determining stage position along the x-axis. Preferably, a rubber bumper 176 is provided as a hard limit stop to dampen and arrest the carriage motion in an over travel condition. The upper surface 178 of the x-carriage 162 is selectively configurable with a plurality of mounting holes shown typically at 179 that are suitable for engaging fixtures or additional subassemblies as required for the particular application.

Figure 5A:
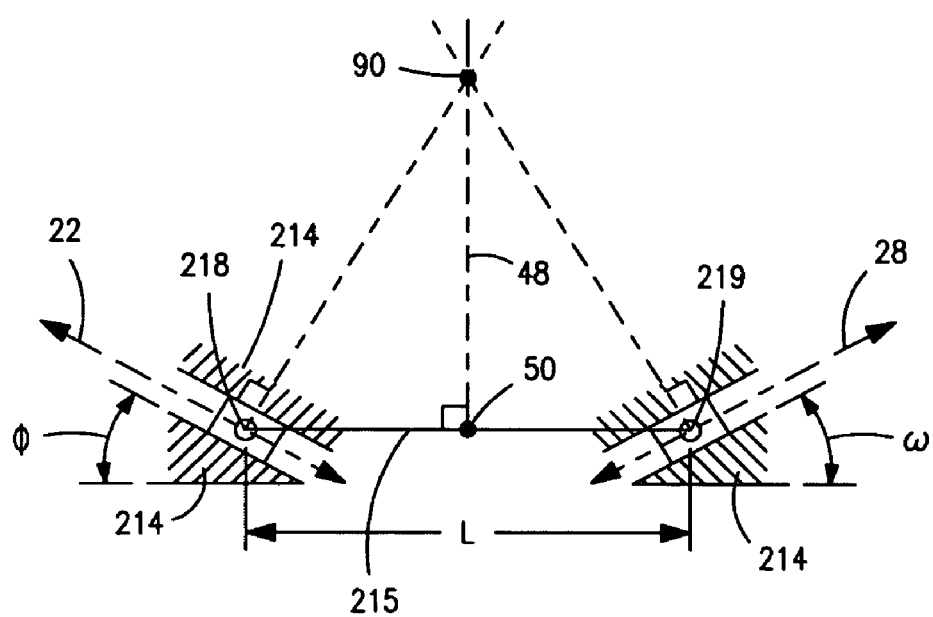
FIG. 5A is a schematic diagram of the yaw stage of the stage assembly of FIG. 3.

Turning to FIG. 5A, the yaw stage 210 is represented schematically. The yaw stage 210 utilizes a four body kinematic linkage to convert linear motion into rotary motion about a predefined pivot or rotation point 90 in space not confined within the envelope of the operating mechanics. The four body kinematic linkage includes a ground link 214, a first slider link 218, a second slider link 219 and a connecting link 215 between the slider links 218, 219. The first slider link 218 has a substantially straight slide path 22 relative to the ground link 214. Preferably, the slide path 22 and the ground link 214 form an angle φ. The second slider link 219 has another substantially straight slide path 28 relative to the ground link 214 which forms an angle ω therewith. The connecting link 215 has a length L. Preferably, the relationship between the length L of the connecting link 215, the angle φ and the angle ω define a rotation point 90 external to the yaw stage 210 as described in detail in co-pending, commonly assigned U.S. patent application Ser. No. 09/810,837 entitled Kinematic Device for Rotating an Object to Matthew R. Maurer filed on Mar. 16, 2001, which is incorporated herein in its entirety by reference.

By defining the rotation point 90 external to the yaw stage envelope, articles 104 may be easily fixtured thereto. Additionally, the substantially straight slide paths 22, 28 are relatively easy to manufacture and adjust by changes in geometry. It is also envisioned that the angle φ and the angle ω, although shown symmetrically, can differ in order to achieve a desired rotation point.

Figure 5B:
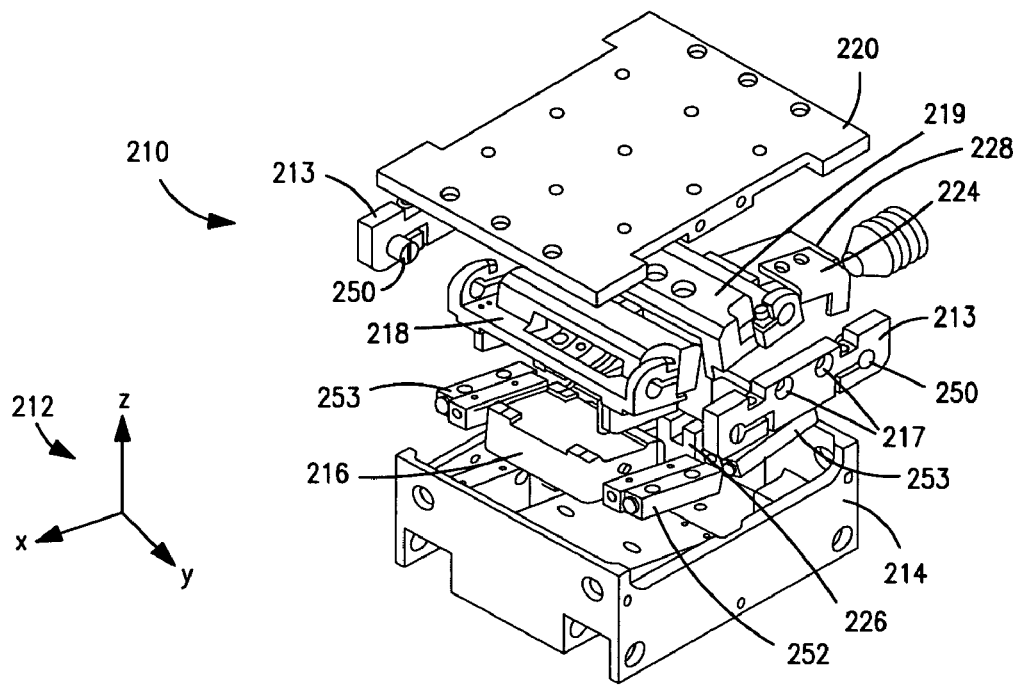
FIG. 5B is a top exploded view of the yaw stage of the stage assembly of FIG. 3.
Figure 5D:
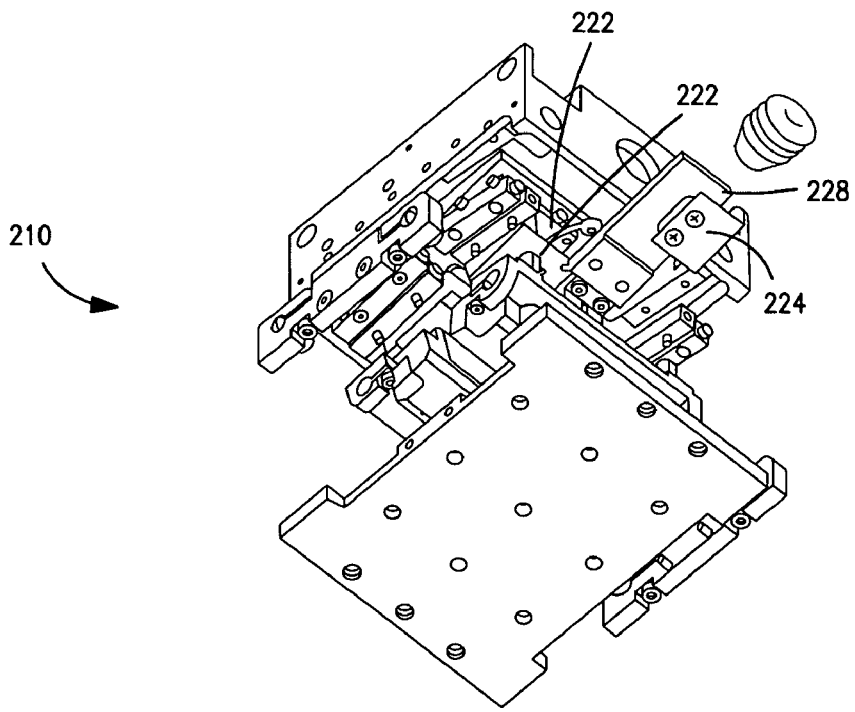
FIG. 5D is a bottom exploded view of the yaw stage of the stage assembly of FIG. 3.

Referring now to FIGS. 5B and 5D, the yaw stage 210 is shown and for clarity a new legend 212 is included. The housing 214 of the yaw stage 210 retains a piezo electric motor assembly 216. The piezo electric motor assembly 216 moves the driver carriage 218 substantially linearly along the slide path 22 (see FIG. 5A). The follower carriage 219 is coupled to the driver carriage 218 and moves as a result of the motion thereof. The use of the terms driver and follower indicate that the driver carriage 218 will induce the motion of the follower carriage 219. Of course, it will be appreciated by those of ordinary skill in the pertinent art that either carriage may serve as the driver or follower.

A carriage 220 is part of the connecting link 215 and preferably a platform structure upon which an article 104 may be attached. A bearing clamp 213 forms the rest of the connecting link 215 and is fastened to the carriage 220 by fasteners (not shown) through mounting holes 217. Flex hinges 250 couple the bearing clamps 213 to the driver carriage 218 and follower carriage 219, respectively. Preferably, the flex hinges 250 are flexible bearings. The flex hinges 250 are effective pivot points which connect the first slider link 218 and the second slider link 219 to the connecting link 215, wherein the first slider link 218 represents the driver carriage 218 and the second slider link 219 represents the follower carriage 219.

Pairs of linear cross roller bearing rails 252, 253 connect the driver carriage 218 and follower carriage 219 to the housing 214, respectively. The housing 214 is the main component of the ground link 214. Again, an encoder assembly 222, a limit flag 224 and a limit sensor 226 are operatively connected to the control system 112 for feedback to indicate the position of the driver carriage 218 and the follower carriage 219. Preferably, the encoder assembly includes a glass grating (not shown) secured to a bracket 229.

Figure 5C:
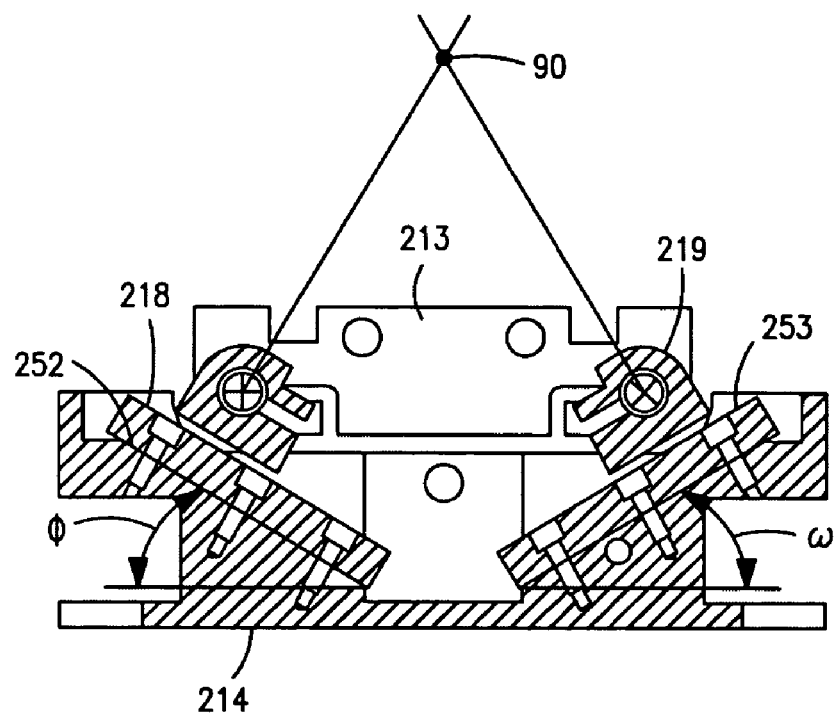
FIG. 5C is a cross-sectional view of the yaw stage of the stage assembly of FIG. 3.
Figure 6A:
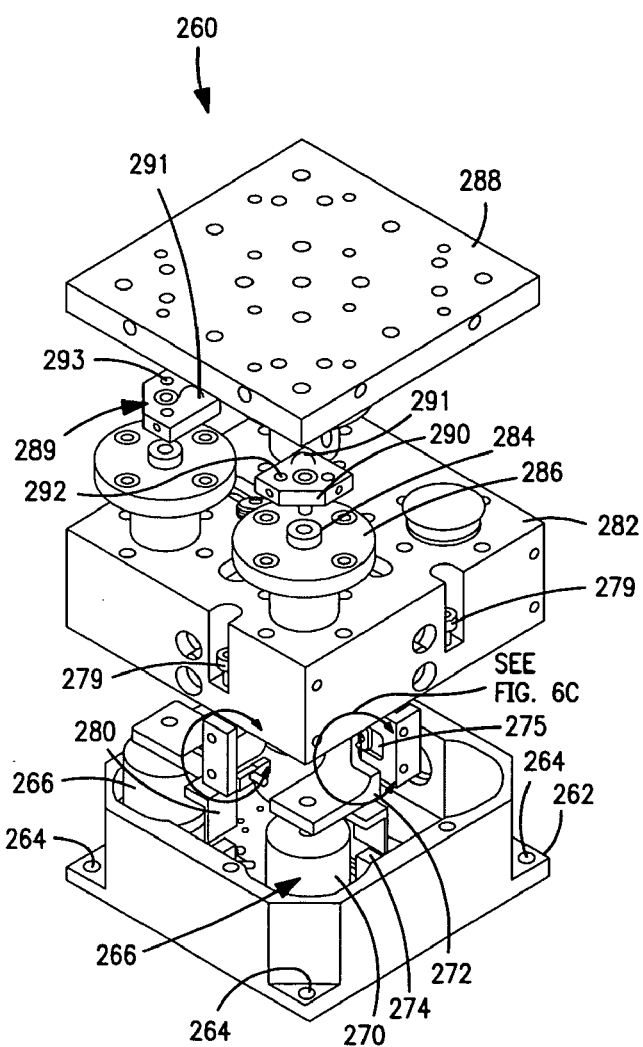
FIG. 6A is an exploded view of the three-axis stage of the stage assembly of FIG. 3.
Figure 6B:
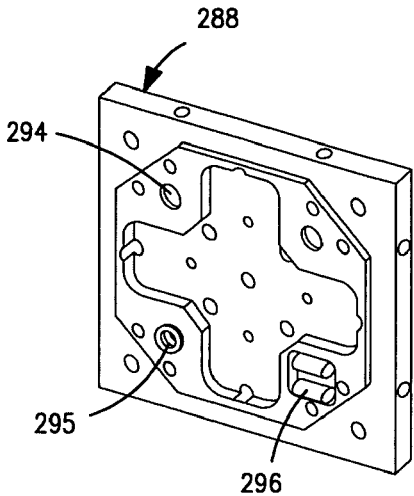
FIG. 6B is a bottom view of the tip/tilt plate of the three-axis stage of FIG. 6A.
Figure 6C:
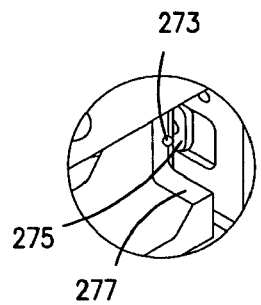
FIG. 6C is a localized enlarged view of the three-axis stage of FIG. 6A.
Figure 6D:
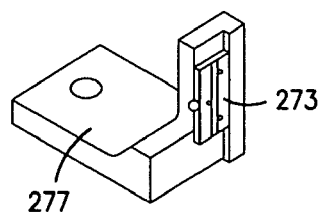
FIG. 6D is a perspective view of a portion of an encoder of the three-axis stage of FIG. 6A.

Referring now to FIG. 5C, the pairs of linear cross roller bearing rails 252, 253 connected to the housing 214 form the angles φ and ω, respectively. One linear cross roller bearing rail 252 is movably connected to the driver carriage 218 to provide the first slide path 22 and the other linear cross roller bearing rail 253 is movably connected to the follower carriage 219 to provide the second slide path 28 (see FIG. 5A). The bearing clamp 213 has a length which corresponds to the length L of the connecting link 215. The length L together with the angles φ and ω define the rotation point 90 of the yaw stage 210. By varying the parameters of the length L, the angle φ and the angle ω, the rotation point 90 of the yaw stage 210 can be modified. For example, the housing 214 may be machined differently to change the angles φ and ω. In another embodiment, the length L corresponding to the bearing clamp 213 can be changed to vary the rotation point 90 of the yaw stage 210. In still another embodiment, the yaw stage 210 is modified to allow for dynamic adjustment of the angles φ and ω, as would be readily appreciated by one of ordinary skill in the pertinent art upon review of the subject disclosure.

As best seen in FIG. 3A, the three-axis stage 260 mounts to the carriage 220. Threaded fasteners 228 support the weight of the three-axis stage 260 and conventional fasteners link the two stages together. As a result, the three-axis stage 260 and any optoelectronic component 104 fixed thereto are subject to the yaw motion of the yaw stage 210.

Referring now to FIGS. 6A–D, in a preferred embodiment, the three-axis stage 260 is mounted on the base stage 140 (see FIG. 2). A base housing 262 of the three-axis stage 260 includes bores 264 for fastening each corner thereof. The base housing 262 retains three linear motor assemblies 266 (only two shown) for providing independent y-motion. Preferably, the three linear motor assemblies 266 are linear voice coil motor assemblies although the motor assemblies 266 may be piezo-electric stacks or any other suitable motor type as would be appreciated by those of ordinary skill in the pertinent art based upon review of the subject disclosure. The portion of each linear voice coil motor assembly 266 within the base housing 262 includes a voice coil 270 for providing a driving force and an encoder assembly 272 for tracking position of the motor assembly 266. The encoder assembly 272 includes a glass grating 273 and a read head 275 as would be known to those of ordinary skill in the pertinent art. The read head 275 is secured on a mounting bracket 277 by fasteners (not shown). A limit sensor 274 secured to the base housing 262 interacts with a limit flag 280 which moves with the linear voice coil 270 to provide reference position and over travel notification.

An intermediary block 282 which houses the remaining portion of the three linear motor assemblies 266 secures to the housing 262 by four fasteners 279 (two shown). In another embodiment, the intermediary block 282 and housing 262 are monolithic. A shaft 284 extends from each linear motor assembly 266 through the intermediary block 282. Linear ball splines 286 surround the top portion of each shaft 284 to insure smooth motion thereof.

The three linear motor assemblies 266 support a tip/tilt plate 288. A respective flange 290 couples the tip/tilt plate 288 to each linear ball spline 286 using a respective kinematic mount 289. Each kinematic mount 289 is defined by the flange 290 having a hardened ball 291 on a top surface thereof. Preferably, each ball 291 is formed of hardened tungsten carbide. Each flange 290 as well as the tip/tilt plate 288 include apertures 292 for fixedly receiving tensioning springs 293 (only one shown). Three differently configured locations on the bottom surface of the tip/tilt plate 288 receive the hardened balls 291. The three locations are a flat location 294, ring location 295 and v-shaped location 296. The flat location 294 consists of a hardened flat surface against which the respective hardened ball 291 maintains a point contact. The ring location 295 defines a hollow for receiving and retaining the respective hardened ball 291. The v-shaped location 296 includes a pair of dowel pins 297 which are spaced apart to form a groove therebetween for receiving the respective hardened ball 291. The tensioning springs 293 attach between the tip/tilt plate 288 and the flanges 290, respectively, to secure each hardened ball 291 within the respective location. The flange 290 is secured to the ball spline 286 by conventional fasteners. The tip/tilt plate 288 is variably configurable to receive a fixture for retaining an optoelectronic component 104. As a result, the three linear motor assemblies 266 move a component 104 thereon in the y-axis and rotationally about the x and z axes as selected motors are moved independently to varying degrees and in different directions along the y axis.

Figure 7:
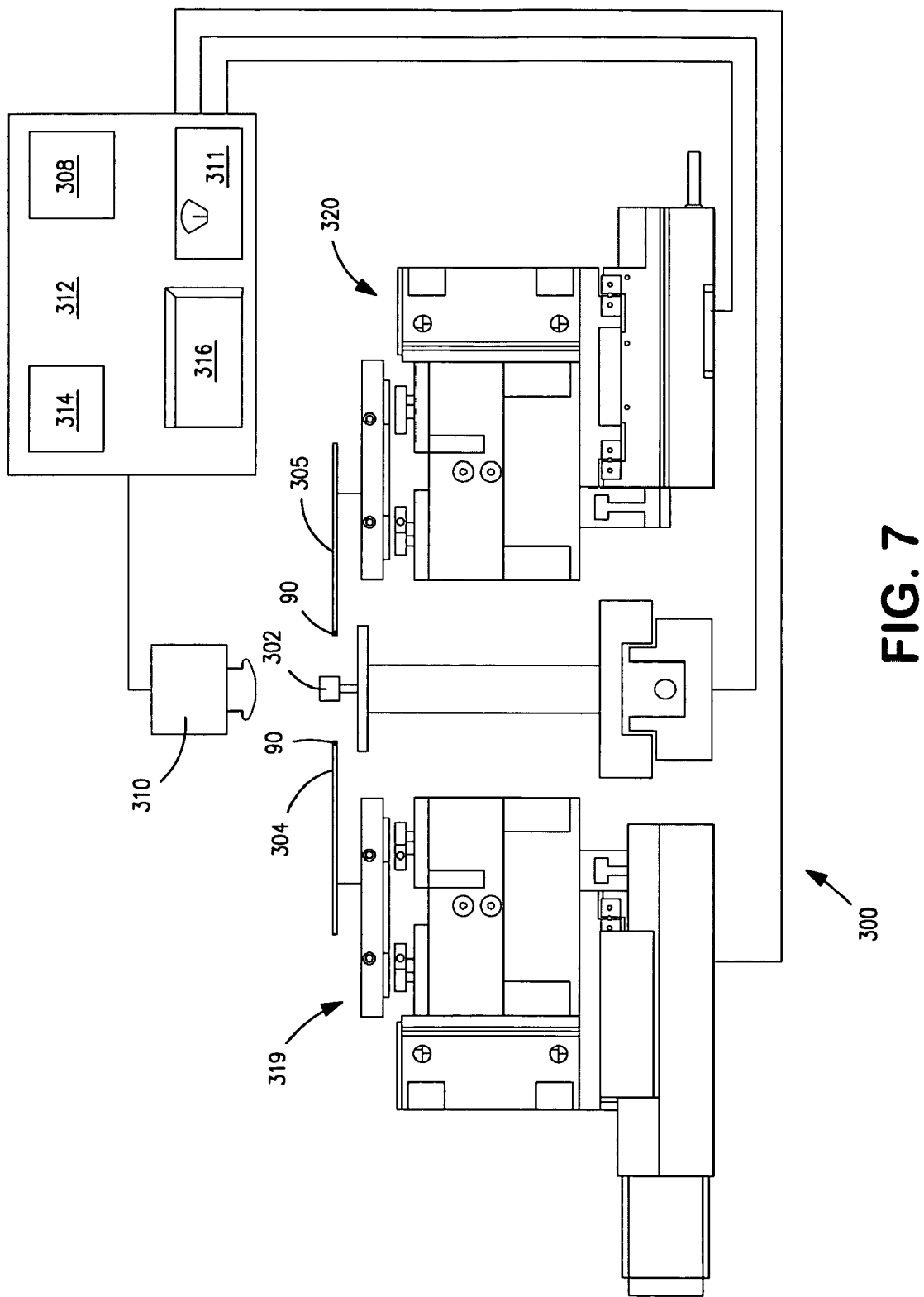
FIG. 7 is a schematic view of another embodiment of the present invention for performing alignment of multiple optical fiber arrays to an optoelectronic device.
Figure 8A:
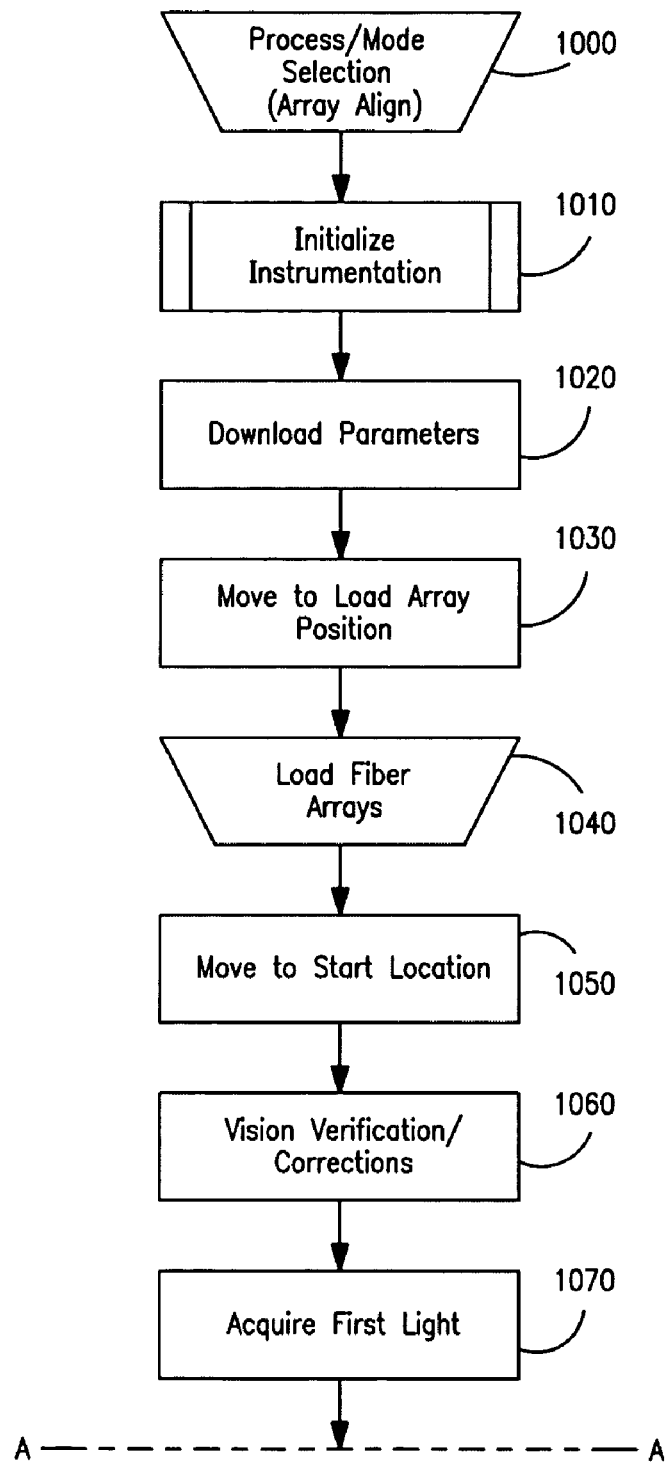
FIG. 8A depicts a first portion of a process flow diagram detailing the various steps associated with the active alignment of two optical fiber arrays to a waveguide in accordance with the present invention.
Figure 8B:
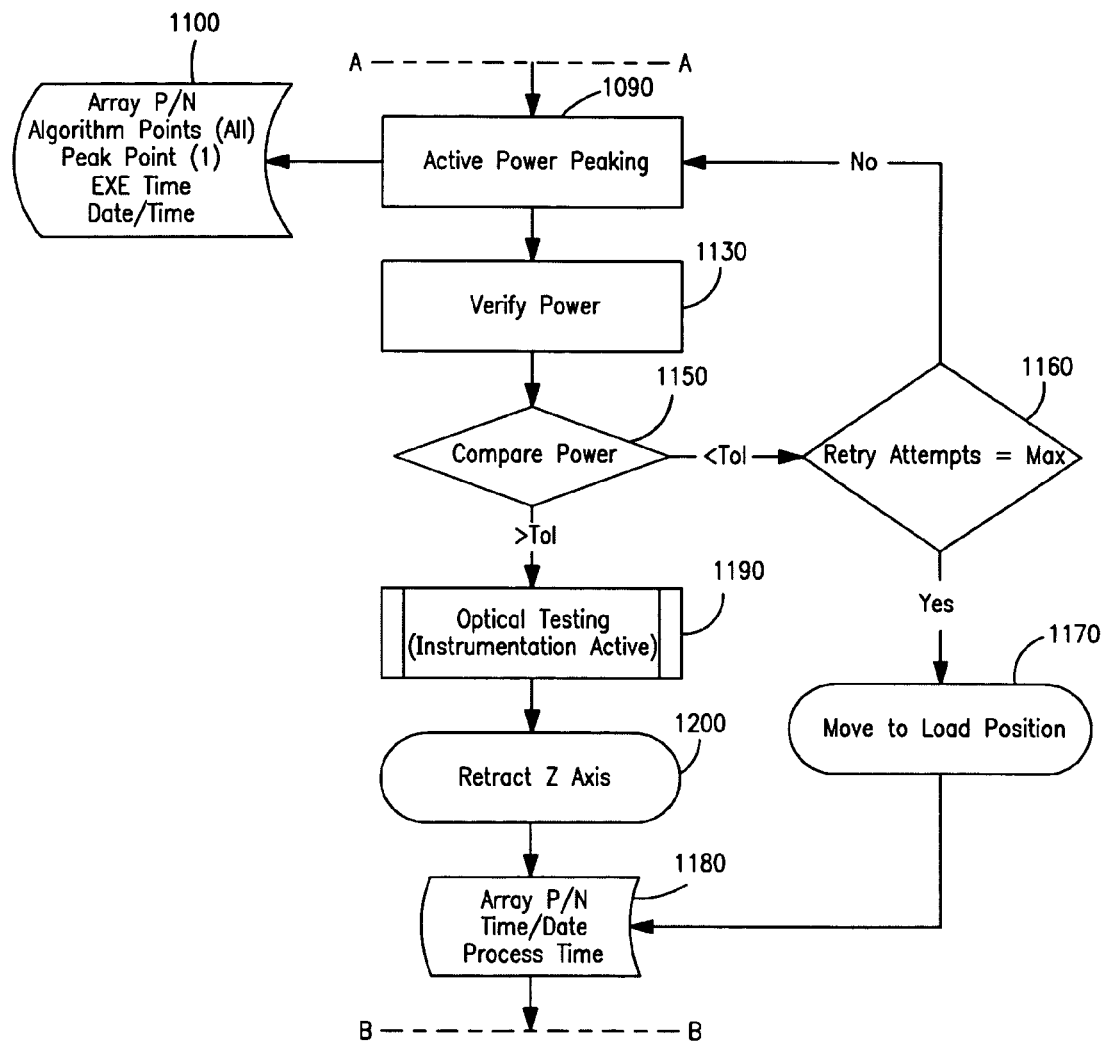
FIG. 8B depicts a second portion of a process flow diagram detailing the various steps associated with the active alignment of two optical fiber arrays to a waveguide in accordance with the present invention.
Figure 8C:
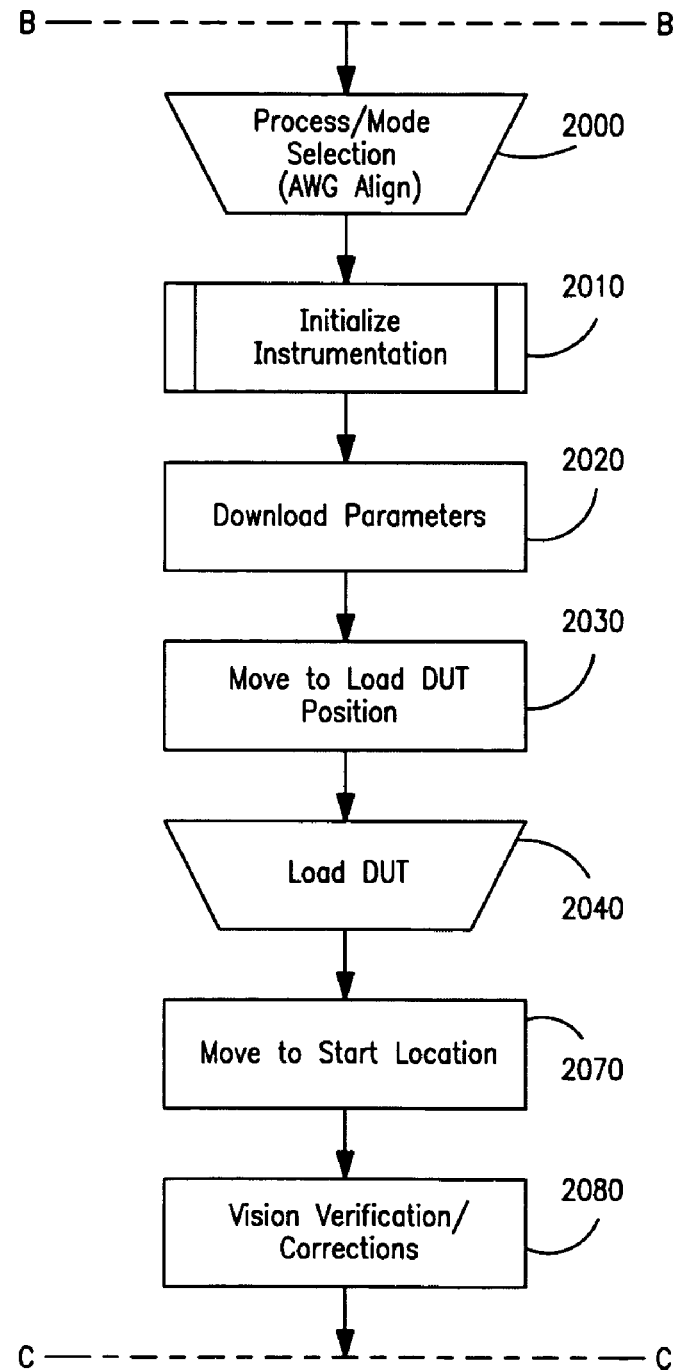
FIG. 8C depicts a third portion of a process flow diagram detailing the various steps associated with the active alignment of two optical fiber arrays to a waveguide in accordance with the present invention.
Figure 8D:
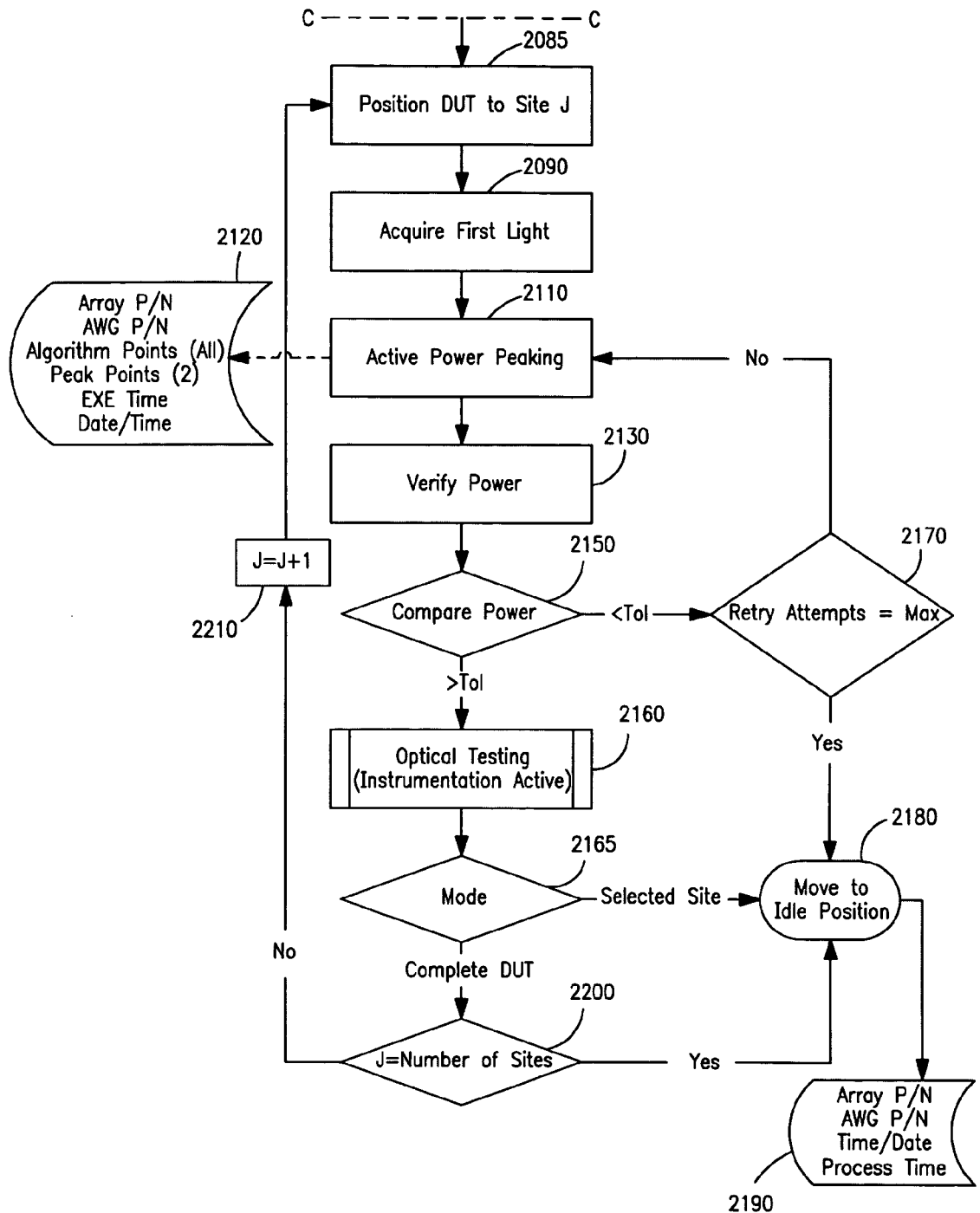
FIG. 8D depicts a fourth portion of a process flow diagram detailing the various steps associated with the active alignment of two optical fiber arrays to a waveguide in accordance with the present invention.

With reference to FIG. 7, the components similar to those identified with respect to the embodiment of FIGS. 1 through 6 above are designated in the drawings with corresponding reference numerals. Accordingly, the following detailed description addresses departures in construction and function of this preferred embodiment from the prior preferred embodiment. Instrument 300 is configured for fabricating double-sided optical devices 302, such as waveguides. A common waveguide 302 requires alignment of optical fiber arrays 304, 305 to opposing sides thereof.

The first fiber array 304 is moved in a manner very similar to that of the example described above. In order to accommodate the alignment of the second fiber array 305, a second stage assembly 320 is included in the instrument 300. Although not required, it is envisioned that the configuration of the second stage assembly 320 is substantially the same as that of the first stage assembly 319. The control system 312 includes a power module 308, a power meter 311, a processing unit 314 and memory 316. The control system 312 can send and receive the necessary signals to control the first and second stage assemblies 319, 320, and the optical prealigner 310. For example, the outputs of the fiber arrays 304, 305 via a power meter 311, the sensors, the encoders and the optical prealigner 310 are all received by the control system 312. During pigtailing the waveguide 302 is fixed on the mounting fixture 306 and the two fiber arrays 304, 305 are independently aligned to opposing sides of the waveguide 302.

Referring now to FIGS. 8A–D, matching lines A—A through C—C illustrate how to properly connect FIGS. 8A–D. Aligning optical fiber arrays 304, 305 to an optoelectronic device 302 begins at start block 1000 in which the type of alignment is selected. The user may choose from a plurality of fiber-fiber alignment, fiber array-waveguide-fiber array alignment, fiber-laser diode alignment, the like and combinations thereof. For this exemplary process, a fiber array-waveguide-fiber array with a preliminary fiber array-fiber array alignment has been selected.

Upon selection of the desired alignment mode, control passes to initialization block 1010. During initialization, the control system 312 downloads necessary parameters for the selected mode and assumes control of the stage assemblies 320. Several optional devices may be connected to the instrument 300, preferably, via GPIB network communication. For example, a power meter, a laser source, an inductance meter and/or optical spectrum analyzer may be utilized and the activation of same occurs at step 1010 as denoted by the shape of the block. Preferably, each optional device functions at the 1310 nm or 1550 nm wavelengths commonly used in telecommunications although any wavelength can be used.

At step 1020, additional parameters are downloaded by the control system 312 as necessary for alignment. For example, the part number of the device being tested, standard calibration data tables and/or unique empirical calibration data tables may be downloaded. Next, control passes to block 1030 where the control system 312 moves the stage assemblies 320 to a loading position for receiving the fiber arrays 304, 305. It will be appreciated by those skilled in the art that any type of optoelectronic device, such as a waveguide or single-mode fiber, may be loaded and aligned in a comparable manner.

Upon arrival at the load position, control passes to block 1040 where the fiber arrays 304, 305 are loaded onto the stage assemblies 320. Preferably, the loading consists of clamping the fiber arrays 304, 305 in place. This placement may be accomplished manually or by means of parts placement devices well known to those skilled in the art. Preferably, the placement includes permanent reference surfaces secured on the stage assemblies 320. The reference surfaces provide banking surfaces which serve to mechanically locate the fiber arrays 304, 305 within the requirements of the optical prealignment system 310. Preferably upon properly locating the fiber arrays 304, 305, vacuum tension retains the fiber arrays 304, 305. It is also envisioned that clamps and other retention mechanisms may be used as would be appreciated by one of ordinary skill in the pertinent art.

At block 1050, the stage assemblies 320 with the fiber arrays 304, 305 secured thereto move to a prealignment position. The prealignment position places the fiber arrays 304, 305 in close proximity to each other. The mechanical placement of the fiber arrays 304, 305 against the reference surfaces and prior calibration of the stage assemblies' prealignment position ensures that the fiber arrays 304, 305 do not touch and thereby risk damage. In a preferred embodiment, the prealignment position was downloaded at step 1020.

As control proceeds to block 1060, optical prealignment allows the stage assemblies 320 to move the fiber arrays 304, 305 into coarse alignment. At coarse alignment, the gap between the two fibers 304, 305 begins to approach a typical final distance such as, for example, 10 um. Optical prealignment captures an image for display to the user and is therefore also referred to as vision correction and the terms are used interchangeably as would be appreciated by those of ordinary skill in the pertinent art. If an acceptable part is not present or omitted, the process ends.

In one embodiment, the user can control the stage assemblies' position based upon the optical image to perform the coarse alignment. Alternatively, the image is digitized and algorithms of a known type to those of ordinary skill in the pertinent art locate a target corresponding to the array tip based upon size and shape. Upon suitably recognizing the target, the control system 312 uses the optical prealignment system 310 to determine the existing gap between the fiber arrays 304, 305. For example, for a particular zoom setting, the field size is known and the distance between the targets can be determined. Alternatively, the stage assemblies 320 may make a jog of a known distance to determine the pixel size. Upon determining the pixel size and the number of pixels between the targets, the product of the two results yields the gap. The stage assemblies 320 move based upon the determined gap and verification of the desired setting occurs. The stage assemblies 320 continue to move the fiber arrays until the gap is within an acceptable parameter and control passes to block 1070.

At block 1070, the instrument 300 continues the vision corrections until first light is acquired. It is envisioned that several scenarios will all be useful and the process disclosed herein is with respect to one exemplary technique, as would be appreciated by those of ordinary skill in the pertinent art based upon review of the subject disclosure. Preferably, a light source in the form of a laser is coupled to one of the fiber arrays 304, 305 for emitting the light which is acquired in this step. Upon acquiring first light, control passes to block 1090.

At block 1090, the process begins a loop for optimizing a channel of the fiber arrays 304, 305. The fidelity across that particular channel is measured and stored as shown in block 1100 after the fiber array to fiber array junction is optimized. The process continues after the data collection to block 1130. In another embodiment, each channel of the fiber arrays 304, 305 is optimized individually and the corresponding data is stored as shown in block 1100. Upon collecting data for each channel, an alignment can be selected which optimizes the total overall performance.

In a preferred embodiment, the output of the other fiber array is based upon a figure of merit, preferably a reading of power on the power meter, and measured to determine the fidelity of the newly aligned junction. In another preferred embodiment, the input light is a modulated signal and the fidelity is based upon a resulting signal-to-noise ratio. Generally, it is most efficient to move only one of the stage assemblies 320 to maximize the fidelity across the junction while the other remains stationary, although it will be appreciated by those of ordinary skill in the pertinent art that many variations are possible.

In one embodiment, one of the stage assemblies 320 is moved in a defined pattern, such as a square centered about the first light stage assembly location. Readings are taken periodically and upon completion of the scanning motion, the location with the maximum fidelity is determined to be optimum. In another embodiment, a hillclimb technique can be used, i.e. the control system 312 will make stage moves based upon signal trend. In particular, the stage assembly 320 will continue to move in a particular direction provided that the signal continues to improve and reverse direction upon deterioration of the signal to land at a local maximum for each axis. Preferably, as each reversal of direction occurs, the size of the movements of the stage assemblies 320 will decrease to increase the precision with which the optimum position is determined. In another embodiment, an operator applies an index matching fluid or gel to one or both of the fiber arrays 304, 305 for reducing the loss across the junction therebetween prior to optimization. In still another preferred embodiment, the dispensing of an index matching fluid or gel is automated.

At block 1130, the power transmitted across the junction as determined by the power meter is measured. In another embodiment, additional characterization specific to a particular wavelength may occur at block 1130. For example, the channel output may be verified using a specific wavelength light source, such as 1550 nm.

At block 1150, the power across the junction is compared to a stored threshold value to determine if the power reading is sufficient. If a power reading is below the threshold, i.e. unacceptable, the instrument 300 attempts peaking again. Accordingly, control passes to block 1160 which tracks the number of attempts. At block 1160, the number of retry attempts is limited to the variable Z. Upon Z attempts, control passes to block 1170 and the system finishes the process by taking an idle position. Upon reaching the idle position, data relating to the process is stored as shown in schematic representation by block 1180. If less than Z attempts have been made, control passes to block 1090 and the process continues.

Referring again to block 1150, upon favorable comparison of the power reading across the junction, i.e. the power reading is above the threshold value, control passes to block 1200. At block 1200, the stage assemblies 320 retract along the z-axis but fiber arrays remain aligned in other aspects and the control passes to block 1180. At block 1180, data relating to the process is stored and control passes to block 2000.

In the process flow diagram and herein, the waveguide 302 is referred to generally by "DUT", i.e. device under test, and it will be appreciated that the terms are used interchangeably. At start block 2000, the type of alignment for the remainder of the process is selected. Although performed consecutively with the completion of block 1180, it will be appreciated by those of ordinary skill in the art that mixing and matching of a plurality of algorithms is possible. In the exemplary process, the AWG Align mode is selected. Upon selection of the desired alignment mode, control passes to initialization block 2010.

During initialization at block 2010, the control system 312 uploads necessary parameters for the selected mode and assumes control of the stage assemblies 320 and processing proceeds to block 2020. At block 2020, similarly to block 1020, additional parameters are downloaded by the control system 312 as necessary for alignment. Upon downloading the necessary parameters, control passes to block 2030.

At block 2030, the stage assemblies 320 move to a position which facilitates mounting the DUT 302, i.e., the standby position. At the standby position, control passes to block 2040 for loading the DUT 302. Preferably, the DUT 302 mounts on a fixture 306 and a light source, preferably in the form of a laser, supplies the necessary power to activate the DUT 302. In a preferred embodiment, the fixture 306 is capable of linear motion along the x-axis to facilitate loading the DUT 302. Upon securely mounting the DUT 302, the fixture 306 moves and settles at a position selected for alignment. Preferably, the mounting includes banking the DUT 302 against a reference surface for repeatable mechanical placement and securing the DUT 302 in place. Preferably, vacuum tension retains the DUT 302. It is also envisioned that clamps and other retention mechanisms may be used as would be appreciated by one of ordinary skill in the pertinent art. Upon securing the DUT 302 in place, control passes to block 2070 where the mounting fixture 306 and stage assemblies 320 are moved to a start position under the optical prealignment system 310. When the DUT is in place under the optical prealignment system 310, control passes to block 2080.

At block 2080, the control system 312 uses the optical prealignment process similarly as described above with respect to block 1060. However, in this instance, the gap is being set between each side of the waveguide 302 and the respective fiber array 304, 305. Upon optical prealignment, the process proceeds to block 2085 where the first of a plurality of sites on the waveguide 302 is selected for alignment and control passes to block 2090.

At block 2090, first light is acquired by applying similar principles to those described above with respect to block 1070. It will be noted that with the DUT 302 in place, the light sources may no longer be necessary as the DUT 302 is activated and the fidelity of the junction from the waveguide 302 to the fiber arrays 304, 305 is of interest.

At block 2110, the fidelity of each channel from each fiber array 304, 305 is actively optimized similarly with block 1090. In contrast with block 1090, the junction includes the DUT 302 which may provide and/or receive signals. A loop is executed for optimizing each site of the junction. Data is collected for a particular site and the fidelity across that particular site is measured as one or both of the fiber array(s) 304, 305 is optimized with respect to the waveguide 302. In a preferred embodiment, the data from each site is stored to allow selecting an overall alignment which optimizes the total performance. At block 2120, the peak points and other data are stored in the memory of the control system 312 during passage through block 2110. Upon maximizing the site alignment, control passes to block 2130.

At block 2130, the power transmitted across the junction as determined by the power meter is measured and control passes to block 2150. At block 2150, the power reading or other desirable figure of merit is compared to a stored threshold value to determine sufficiency. If a power reading is below the threshold, i.e. unacceptable, the instrument 300 attempts peaking again by proceeding to block 2170. At block 2170, the number of retry attempts is limited to the variable Z. Upon Z attempts, control passes to block 2180 and the system finishes the process by taking an idle position. Upon reaching the idle position, data relating to the process is stored as shown in schematic representation by block 2190. If less than Z attempts have been made, control passes to block 2110 and the process continues.

Referring again to block 2150, if the power reading is sufficient, control passes to block 2160. At block 2160, additional characterization specific particular to a specific parameter may occur and the process continues to block 2165. It is envisioned that such additional testing may include optional equipment in communication with the control system 312 over a GPIB Network. For example, the channel output may be verified using a specific wavelength light source, such as 1550 nm.

At block 2165, the mode of alignment is selected. If only a selected site was chosen, control passes to block 2180 and the instrument 300 finishes the process. Preferably, full alignment is selected for each of the sites as shown by the control passing to block 2200. At block 2200, the control system 312 determines if all the sites have been peaked. If all the sites have been peaked, the control system 312 proceeds to block 2190 and the system finishes the process by taking an idle position. If all the sites have not been peaked, the process proceeds to block 2210 where the counter of sites is incremented. From block 2210, the process continues to block 2085 where the looping continues until all "J" sites have been optimized and the related data has been stored. Upon optimization of the junctions between the fiber arrays 304, 305 and waveguide 302, the relationship therebetween may be permanently fixed as described above.

While the invention has been described with respect to preferred embodiments, those skilled in the art will readily appreciate that various changes and/or modifications can be made to the invention without departing from the spirit or scope of the invention as defined by the appended claims. For example, the systems and methods herein may be useful for positioning a disc drive head, semiconductor wafer, lithographic image reticle, traditional light source, such as a bulb, and the like.

What is claimed is:

1. An instrument for positioning an article with at least three degrees of freedom about a selectable pivot point, the instrument comprising:

a base stage for linear motion in two perpendicular axes, the perpendicular axes forming a plane;

a yaw stage, coupled to the base stage, for rotational motion about a third axis, the third axis being normal to the plane, the yaw stage being capable of engaging a mount for fixing an article thereto, thereby positioning the article at a first location, and the yaw stage further having a pivot point locatable outside a footprint defined by the base stage and the yaw stage; and a control system in communication with the base stage and the yaw stage for directing motion of the base stage and the yaw stage and correspondingly the article, wherein the control system includes means for specifying the first location of the article, means for selecting a pivot point of the yaw stage, means for directing motion of the article about the selected pivot point to a desired location of the article by the rotational motion of the yaw stage about the third axis, means for determining a difference between the first location and the desired location, if any, and means for calibrating further motion directives to the base stage and yaw stage based on the selected pivot point and the difference such that the motion of the article to the desired location includes negligible error.

2. An instrument for positioning an article with at least three degrees of freedom about a selectable pivot point, the instrument comprising:

a base stage for linear motion in two perpendicular axes, the perpendicular axes forming a plane;

a yaw stage, coupled to the base stage, for rotational motion about a third axis, the third axis being normal to the plane, the yaw stage being capable of engaging a mount for fixing an article thereto and having a pivot point locatable outside a footprint defined by the base stage and the yaw stage; and a control system in communication with the base stage and the yaw stage for moving each, wherein the pivot point of the yaw stage is calibrated to correspond to a location of the article such that motion of the article to a desired location includes negligible error;

further wherein the yaw stage includes:

a ground link;

a first slider link having a substantially straight first slide path relative to the ground link, wherein the first slide path and the ground link form a first angle;

a second slider link having a substantially straight second slide path relative to the ground link, wherein the second slide path and the ground link form a second angle; and a bearing assembly substantially defining a connecting link and a length, wherein a relationship between the length, the first angle and the second angle defines a pivot point external to the yaw stage.

3. An instrument as recited in claim 2, further comprising a mount coupled to the yaw stage for fixing the article thereto such that an operative portion of the article is locatable outside an envelope defined by the base stage and the yaw stage.

4. An instrument as recited in claim 2, further comprising a third stage for rotational motion about each of the two perpendicular axes and linear motion along the third axis, wherein the third stage is coupled to the yaw stage and includes a mount for fixing the article thereto.

5. An instrument as recited in claim 4, wherein the third stage includes a plate;

a base; and three actuators connected between the plate and the base for moving the plate with respect to the base, each of the three actuators creating motion substantially parallel to the third axis.

6. An instrument as recited in claim 2, wherein the bearing assembly defines mounting holes for engaging a plate thereto.

7. An instrument as recited in claim 2, further comprising a mounting fixture for securing a device under test for aligning the article thereto.

8. An instrument as recited in claim 2, wherein the pivot point is variable by adjustment of at least one length, the first angle and the second angle.

9. An instrument as recited in claim 2, wherein the article is an optical fiber aligned to a laser diode, the control system includes a power measuring device coupled to an output of the optical fiber, and the control system is capable of controlling each stage based upon an output from the power measuring device.

10. An instrument for coupling an optical fiber with an optical device comprising:

a control system having a processor and memory for storing instructions for the processor;

a stage assembly in communication with the control system having at least five degrees of freedom for positioning the optical fiber at different locations with respect to the optical device, the stage assembly defining an envelope and a pivot point location locatable outside the envelope, wherein the memory also stores location data specifying a first location of the optical fiber and the pivot point location, movement data relating to motion of the stage assembly and correspondingly the optical fiber about a pivot point at the pivot point location, and calibration data relating to predicted and measured differences between motion of the optical fiber from the first location about the pivot point for increasing an accuracy of moves of the stage assembly; and a mounting fixture for receiving the optical device and providing power thereto.

11. An instrument for coupling an optical fiber with an optical device comprising:

a control system having a processor and memory for storing instructions for the processor;

a stage assembly in communication with the control system having at least five degrees of freedom for positioning the optical fiber with respect to the optical device, the stage assembly defining an envelope and a pivot point locatable outside the envelope, wherein the memory also stores data related to the pivot point for increasing an accuracy of moves of the stage assembly;

a mounting fixture for receiving the optical device and providing power thereto; and a prealignment system coupled to the control assembly for acquiring first light across a junction between the optical fiber and the optical device, wherein upon acquiring first light, the control system drives the stage assembly to maximize fidelity across the junction by storing data associated with positions of the stage assembly.

12. An instrument as recited in claim 11, wherein the optical device is selected from the group including an optical fiber, a waveguide, a MEMS, a laser diode, a collimator, a modulator, discrete optics and an optical fiber array.

13. An instrument for coupling an optical fiber with an optical device comprising:

a control system having a processor and memory for storing instructions for the processor;

a stage assembly in communication with the control system having at least five degrees of freedom for positioning the optical fiber with respect to the optical device, the stage assembly defining an envelope and a pivot point locatable outside the envelope, wherein the memory also stores data related to the pivot point for increasing an accuracy of moves of the stage assembly;

a mounting fixture for receiving the optical device and providing power thereto; and a second stage assembly in communication with the control system having six degrees of freedom for positioning a second optical fiber with respect to the optical device, the second stage assembly defining an envelope of the second stage assembly and a second pivot point outside the envelope of the second stage assembly, wherein the memory also stores data related to the calibration data related to the second pivot point for increasing an accuracy of moves of the second stage assembly.

14. A method for aligning a first component to a second component comprising:

removably coupling a first component to a fixture;

removably coupling a second component having an end to a stage assembly for positioning the second component, the stage assembly having motion in six axes;

specifying a first location of the end of the second component;

selecting a pivot point of the stage assembly;

moving the second component about the selected pivot point to a desired location of the end of the second component;

determining a difference between the first location and the desired location, if any;

determining calibration data for accurate movement of the second component about the selected pivot point based on the selected pivot point and the difference;

capturing light by aligning a junction between the first component and the second component; and maximizing fidelity across the junction by positioning the stage assembly and thereby the second component, and wherein moving the end of the second component is based upon the calibration data.

15. A method as recited in claim 14, wherein the pivot point is locatable outside an envelope of the stage assembly.

16. An alignment system for positioning an article with respect to a second article, the alignment system comprising:

a tip/tilt plate substantially oriented in a plane having an x axis and a z axis;

a fixture for attaching an elongated article to the tip/tilt plate along the z axis;

first, second and third linear motors coupled to the tilt/tip plate for supporting the tip/tilt plate and positioning the tip/tilt plate along a y axis and rotationally about the x axis and the z axis, the y axis being perpendicular to the plane;

a first housing for supporting the first, second and third linear motors;

a carriage movable in a plane defined by the x and z axes, the carriage being adapted and configured to support and displace the first housing and thereby the tip/tilt plate in a rotational motion about the y axis;

an elongated bearing clamp assembly for supporting the carriage;

a drive motor assembly for linear displacement of a driver carriage and thereby, a follower carriage, the driver carriage forming a first angle with the x axis and the follower carriage forming a second angle with the x axis;

flexible hinges for coupling the elongated bearing clamp assembly to the driver and follower carriages;

a second housing for retaining the driver motor assembly and the carriage; and a two axis linear stage assembly supporting and positioning the second housing along the x axis.

17. An alignment system as recited in claim 16, wherein the article is a single mode fiber and the second article is a laser diode.

18. An alignment system as recited in claim 16, wherein the article is an optical fiber array and the second article is an optical waveguide.

19. An alignment system as recited in claim 16, wherein the first, second and third linear motors are linear voice coil motors.

20. An alignment system as recited in claim 16, wherein the tip/tilt plate is square and the first, second and third linear motors are coupled approximately in three corners of the square.

21. An alignment system as recited in claim 16, wherein the carriage has a connector link defining a length, wherein the length, the first angle and the second angle determine a pivot point of the rotational motion about the y axis.

22. An alignment system as recited in claim 21, wherein the pivot point is outside an envelope of the alignment system.

23. An alignment system as recited in claim 16, wherein an envelope is determined by a substantially minimized size of the alignment system, the envelope being approximately defined by a length and a width of the two axis linear stage in the x and z axes, and a distance from a bottom of the two axis linear stage and a top of the tip/tilt plate in the y axis.

24. An alignment system as recited in claim 16, further comprising a control system operatively connected to the alignment system for storing data, positioning the alignment system and determining an optimum position of the article.

* * * * *